United States Patent [19]

Murai

[11] Patent Number: 4,547,066
[45] Date of Patent: Oct. 15, 1985

[54] EXPOSURE APPARATUS

[75] Inventor: Kaoru Murai, Chofu, Japan

[73] Assignee: ORC Manufacturing Co., Ltd., Chofu, Japan

[21] Appl. No.: 469,088

[22] Filed: Feb. 23, 1983

[30] Foreign Application Priority Data

Feb. 24, 1982 [JP] Japan .................................. 57-28360

[51] Int. Cl.$^4$ ............................................ G03B 27/04
[52] U.S. Cl. ...................................... 355/97; 355/100
[58] Field of Search ................. 353/15, 27 R, DIG. 1;
369/77.2, 38, 39; 355/40, 75, 85, 91, 99, 100, 97;
414/416

[56] References Cited

U.S. PATENT DOCUMENTS

| 3,810,694 | 5/1974 | Harrell et al. | 355/85 X |
| 4,353,647 | 10/1982 | Harrell et al. | 355/85 |
| 4,362,454 | 12/1982 | Kripzak | 414/416 |

FOREIGN PATENT DOCUMENTS 50-57226  5/1975  Japan .

Primary Examiner—L. T. Hix
Assistant Examiner—Della J. Rutledge
Attorney, Agent, or Firm—Fidelman, Wolffe & Waldron

[57] ABSTRACT

An exposure apparatus has a shelf structure, an exposure base and a movable frame. The shelf structure receives a plurality of palettes on which filmy bodies, such as mask films, are placed. Each palette can be moved vertically together with a partition plate, and it can be moved on the upper surface of the exposure base when it is made flush with the surface as the exposure base abuts on the shelf structure. Each palette is provided with a recession and a notch on its front end for abutting engagement with pins on the exposure base in order to achieve an automatic positioning. The movable frame is allowed to move only vertically and provided with hangers each having a sucking disk for attracting a filmy body. A mask film, sheets of original patterns and a raw film are successively stacked on the exposure base by virtue of vertical movements of the frame and reciprocation of the palettes on the exposure base. A light source for exposure is installed within the exposure base. A lamp is also installed within the base for allowing visual inspection of a combination of a mask film and sheets of original patterns.

2 Claims, 3 Drawing Figures

000
EXPOSURE APPARATUS

FIELD OF THE INVENTION

The present invention relates to an exposure apparatus and, more particularly, to an exposure apparatus which can precisely position a mask film, sheets of orignal patterns and a raw film during an automatic exposure operation and which enables one to finally inspect a combination of the mask film and the sheets of original patterns with ease.

BACKGROUND OF THE INVENTION

Heretofore, an exposure apparatus has existed which comprises raw film palettes for removably holding a plurality of raw films, original pattern palettes for removably holding sheets of original patterns and mask palettes for removably holding mask films for automatic photo-engraving process. These palettes are installed in a shelf structure such that they can be withdrawn and moved up and down, and predetermined palettes on the shelf structure are successively moved to the positions corresponding to position on an exposure base so as to partially protrude outside the shelf structure in accordance with a program. Then, a hanger having a sucking disk fixed on its tip is lowered onto the protruding palette. Thereafter, the air in the sucking disk is evacuated to attract one raw film, mask film or a sheet of original pattern held on the palette. Then the hanger is elevated, moved along the upper surface of the exposure base and put into alignment with the position on the exposure base, whereupon the hanger is lowered to the predetermined position. Then, the vacuum in the sucking disk is extinguished to place the carried film or sheet in the predetermined position on the exposure base.

This automatic exposure apparatus is so constructed that a light source for exposure is disposed above the exposure base, and therefore a raw film, sheets of original pattern and a mask film are stacked on the base in this order. Consequently, even when an attempt is made to finally check up a combination of sheets of original patterns and a mask film by projecting light on the combination stacked on the exposure base, no successful result will be produced, because a raw film has been already placed on the base.

Further, any film or sheet withdrawn from a palette must be moved along a complicated path. In particular, it is required that each film or sheet be elevated and then moved laterally along the upper surface of the exposure base. Therefore, the means for conveying the films and sheets from the palettes onto the exposure base is made complicated in construction. In addition, films and sheets on the base are difficult to precisely position relative to the base and relative to one another, thus always necessitating a check on the positioning.

Furthermore, the aforementioned means for conveying those films and sheets is disposed above the exposure base, but the light source is also disposed above the base. Consequently, the space in which the conveying means can be installed is seriously limited and limitations are unavoidably imposed on the design of the conveying means.

SUMMARY OF THE INVENTION

Accordingly, it is an object of the present invention to remove the aforementioned difficulties. This object is accomplished by providing an exposure apparatus which comprises palettes holding raw films, mask films and sheets of original patterns thereon and capable of being pulled to a predetermined position on an exposure base from within a shelf structure, an attracting means acting to convey the raw films and so forth onto the base from the palettes and being movable only up and down, and a light source for exposure that is incorporated in the exposure base.

Other objects of the invention will apear in the course of the description thereof which follows.

DETAILED DESCRIPTION OF THE INVENTION

Figure 1:
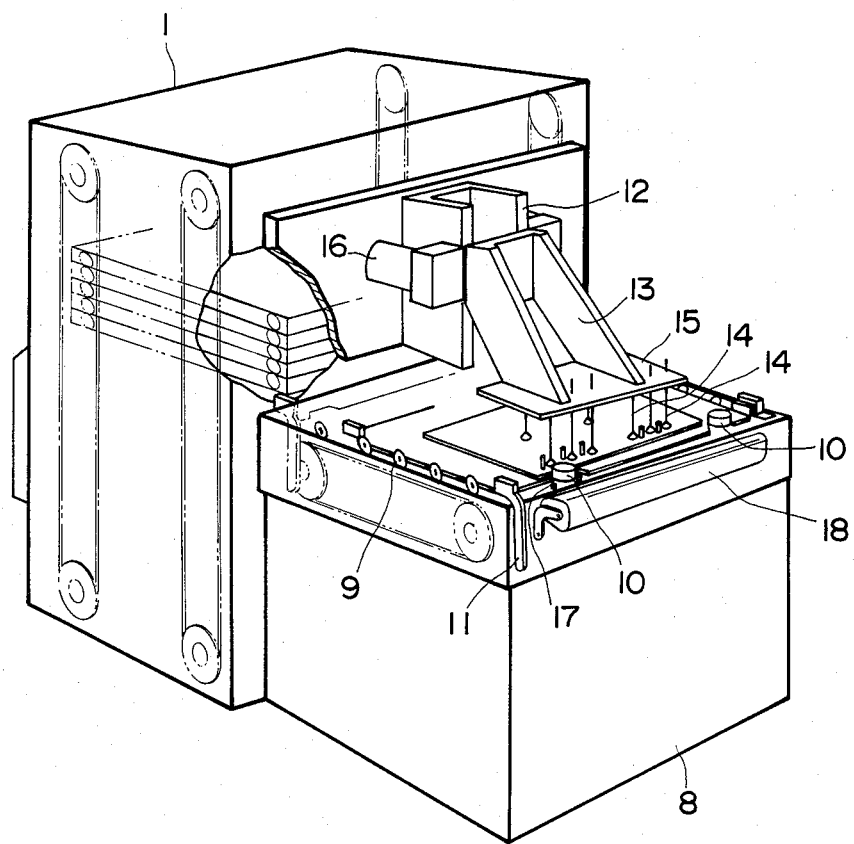
FIG. 1 is a perspective view of an exposure apparatus embodying the concept of the present invention with a portion thereof cut away.

Referring first to FIG. 1, there is shown the general construction of an exposure apparatus according to the invention. This apparatus has a shelf construction 1 the inside of which is partitioned into a plurality of spaces by partition plates, that can be moved up or down while their interrelations are maintained by the instructions from the outside.

Figure 2:
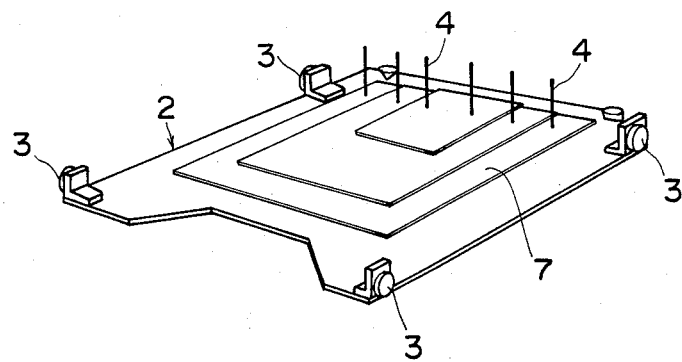
FIG. 2 is a perspective view of one palette held in the apparatus shown in FIG. 1.
Figure 3:
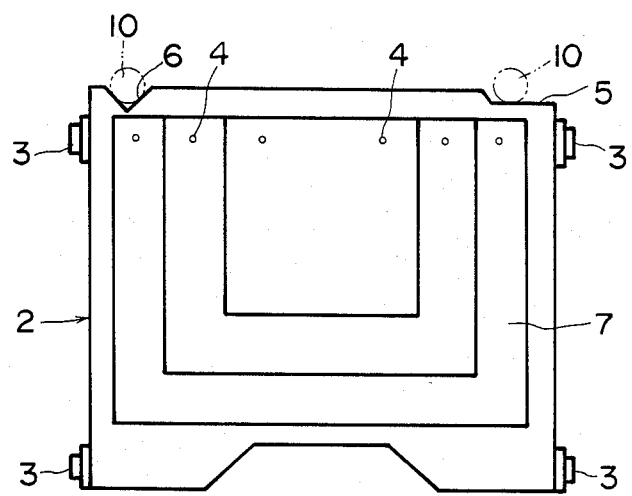
FIG. 3 is a plan view of the palette of FIG. 2.

Each partition plate holds a palette 2 as shown in FIGS. 2 and 3 such that it can be withdrawn therefrom. The palette 2 is made of a rectangular flat plate whose four corners have rollers 3 rotatably attached thereto for moving purposes. One side end of the front side of the palette is provided with a positioning recession 5 which comes into abutting engagement with a stop 10 on an exposure base 8, described later, to precisely define the most advanced position of the palette 2 on the base 8. The opposite side end of the front side is provided with a notch 6 which serves not only to precisely define the most advanced position of the palette 2 on the base 8 but to attain a lateral positioning.

Pins 4 projecting from the upper surface of the palette 2 near the front end act to lock a filmy body 7, such as a mask film, a sheet of original pattern, a raw film or the like, in a given position on the palette. The pins 4 are installed in such a manner that they can accommodate several standardized dimensions of filmy bodies 7 which may be placed on the palette 2. In the example shown in FIGS. 2 and 3, the pins are set in the palette so that they can suit three standardized dimensions of one filmy body 7, as for example a mask film.

The exposure base 8 abuts on the shelf structure 1 housing a number of palettes 2 and holds a ultraviolet ray source therein, so that raw films placed on the base 8 are exposed to the light emanating from the source.

A number of rollers 9 for moving the palettes 2 withdrawn from the inside of the frame 1 are rotatably installed on the upper surface of the exposure base 8 along either side end of the surface. Projecting from the front end on the upper surface are the aforementioned stops 10 with which the positioning recession 5 and notch 6 in the palette 2 moving forward on the base 8 are brought into abutting engagement. Also projecting from the front end of the upper surface of the base 8 are positioning pins 17 which are to be located just beneath the aforementioned pins 4 halted in position on the base 8 to keep the filmy body 7 stationary on the base 8. The height of the pins 17 are so set that they do not obstruct the movement of the palette 2 on the base 8 and the pressing and locking action of a light shutoff plate 18, described later, on the filmy body 7.

The base 8 is equipped with a conveying means for conveying the palette 2 from the inside of the shelf structure 1 to a given position on the base 8 and for carrying the palette from the base 8 back into the shelf structure 1. More specifically, in the embodiment as shown, a pair of chains extend longitudinally of the base 8 along either side surface of the base, and carrier elements 11 are attached to the chains. The elements 11 are anchored to rollers 3 for moving the palette 2 whose front end protrudes from the inside of the structure 1. In this way the palette 2 is moved on the base 8 by moving the carrier elements 11 together with the chains.

Installed on the upper end of the front surface of the base 8 is the flexible plate 18 in the form of a winding for shutting off light. This plate covers a stack of filmy bodies 7 comprising a mask film placed on the base 8, sheets of original patterns on the mask film and a raw film stacked on top of the sheets, and it presses the filmy bodies fixedly against the base 8 by evacuating the space within the plate 18, so that no air gap may be formed between any two of the filmy bodies stacked on top of each other.

Securely fixed on the front surface of the frame 1 above the base 8 is a guide frame 12, to which a vertically movable frame 13 is attached. The frame 13 can move up and down along the frame 12 and has a supporting plate 15, which is attached to the front ends thereof and held just above the base 8. A plurality of hangers 14 each of which has a sucking disk on its lower end are attached to the plate 15 secured to the front ends of the frame 13. The sucking disks of the hangers are connected to an evacuating means (not shown) to permit the filmy bodies 7 to be attracted and held to the disks. Indicated by reference numeral 16 is an electric motor for moving the frame 13 up or down.

In the operation of the apparatus constructed as described so far, one palette 2 holding a desired mask film is first moved vertically to the position corresponding to a position on the surface of the base 8 within the shelf structure 1 in accordance with a program entered in a computer, and then it is stopped. In this condition, the palette 2 protrudes slightly over the base 8. Then, the carrier elements 11 cause the palette 2 to slide on the rollers 9 until the recession 5 and the notch 6 come into abutting engagement with their respective stops 10. In this way, the palette is put on the base 8.

After the palette 2 is halted in position by bringing the recession 5 and notch 6 into engagement with the stops 10, the frame 13 is lowered in order to attract the mask film on the palette 2 to one hanger 14, while the palette is made stationary. Thereafter, the frame 13 is elevated to pull the film up from the palette.

After pulling the desired mask film up, the palette 2 is moved back into the shelf structure 1, and then the frame 13 is lowered to release the attracted film from it and to place the film on the base 8. At this time, a reference hole in the film comes into registry with a positioning pin 17 installed on the base 8 and so the pin 17 is fitted into the hole simultaneously with the placement, because the film was held in a predetermined relation on the plate 2, and because the plate 2 was fixedly held in position on the base 8 owing to the engagements of the recession 5 and notch 6 with the stops 10. In this manner, a precise positioning is achieved just when the film is placed. After completing the placement of the film onto the base 8, the frame 13 is moved upward and put into a standby state. That is, the frame waits for the arrival of the next filmy body 7 at the point just below the frame.

By repeating these operations, a mask films, a desired number of sheets of original patterns and a raw film are successively stacked on the base 8 in this order, and it is possible to directly examine a combination of the mask film and the sheets of original patterns for its correctness by lighting the lamp in the base 8 prior to the stacking operation of the last raw film, if needed.

After completing a heap of filmy bodies 7 on the base 8, the plate 18 is unwound to cover the filmy bodies 7. At the same time, the space within the plate 18 is evacuated and the plate is caused to press the bodies against the base 8.

When the plate 18 has been set to a predetermined state, the ultraviolet ray lamp installed in the base 8 is lit, thus completing an exposure operation. Thereafter, the filmy bodies stacked on the base 8 are successively carried onto a predetermined palette 2 and placed thereon in the order opposite to the foregoing procedure.

When one filmy body 7 is conveyed from the base 8 to the palette 2, the frame 13 effects only vertical movements again. Since the palette 2 is halted above the base 8 in such a manner that its pin 4 is situated just above the positioning pin 17, the filmy body is precisely positioned relative to the upper surface of the palette and placed on it.

That is, conveyance of filmy bodies 7 between palette 2 and the exposure base 8 is attained only by simple, vertical, translational movements, and therefore every transfer can be always carried out while holding the precisely positioned state. In addition, the construction of the means for conveying filmy bodies 7 can be made simpler.

Also, since the ultraviolet ray lamp acting as the exposure light source is installed in the base 8, it is possible to obtain a sufficient space above the base 8 to allow the vertically movable frame 13 to use a lift mechanism which is carefully designed and constructed so as not to produce any mechanical error.

Furthermore, since the exposure light source is installed in the base 8, any raw film is laid at the top of a heap of filmy bodies 7. This enables one to visually and directly inspect a combination of a mask film and sheets of original patterns prior to the placement of a raw film, if needed.

As can be understood from the above description, the present invention allows the transfer of any filmy body, such as a mask film, a sheet of original pattern and a raw film, while keeping it in an accurately positioned state at all times. Further, the mechanism for conveying filmy bodies can be simple in construction and no spatial limitations are imposed upon the mechanism, whereby a means operating precisely and reliably can be used for the mechanism. Furthermore, if the need arises, a combination of a mask film and sheets of original patterns can be freely, directly and visually inspected. Thus, the apparatus according to the invention is inexpensive to fabricate and operates precisely and reliably. In addition, it is very convenient to use.

What is claimed is:

1. In an exposure apparatus comprising an exposure base having an exposure light, a top surface, and a bottom surface; a shelf structure adjacent said exposure base; palettes stacked in said shelf structure with each palette carrying at least one of a plurality of sheets, said sheets comprising masks, patterns, and unexposed film; means for moving a selected palette to a position adjacent said top surface so as to provide access to a sheet carried thereon; and means for successively transferring sheets from selected palettes onto said exposure base top surface in order to provide a stack of sheets on said top surface comprising a sheet of unexposed film, a mask, and a pattern such that portions of said unexposed film are selectively exposed, the improvement comprising:

sheet position references, palette position references, and base position references;

means for moving said selected palette from said selected position across said top surface and for aligning said base and palette references, so as to align said base references with said sheet references of a sheet carried by said selected palette, said sheet and palette references previously being aligned to provide an aligned sheet, and for moving an empty palette back to said selected position;

said sheet transferring means comprising means for moving selected aligned sheets from said palette in a direction generally normal to said top surface, to provide and allow movement of said empty palette from said exposure base top surface, and for moving said selected aligned sheet opposite to said direction and onto said exposure base in order to provide said stack and for retracting said sheet transferring means away from said exposure base;

said unexposed film being positioned on said stack farthest from said top surface; and said light being located adjacent said bottom surface, such that correctness of combination of said mask and pattern sheets of said stack may be examined by illuminating said light prior to providing said unexposed film to said stack.

2. In an exposure apparatus comprising an exposure base having an exposure light, a top surface, and a bottom surface; a shelf structure adjacent said exposure base; palettes stacked in said shelf structure with each palette carrying at least one of a plurality of sheets, said sheets comprising masks, patterns, and unexposed film; means for moving a selected palette to a position adjacent said top surface so as to provide access to a sheet carried thereon; and means for successively transferring sheets from selected palettes onto said exposure base top surface in order to provide a stack of sheets on said top surface comprising a sheet of unexposed film, a mask, and a pattern such that portions of said unexposed film are selectively exposed, the improvement comprising:

means for building said stack by individually and successively placing said sheets at an exposure station with said unexposed film being positioned on said stack farthest from said top surface; and said light being located adjacent said bottom surface, such that correctness of combination of said mask and pattern sheets of said stack may be examined by illuminating said light prior to providing said unexposed film to said stack.

* * * * *